(12) United States Patent
Kwag et al.

(10) Patent No.: US 9,799,862 B2
(45) Date of Patent: Oct. 24, 2017

(54) BATTERY PACK

(71) Applicant: Samsung SDI Co., Ltd., Yongin-si, Gyeonggi-do (KR)

(72) Inventors: No-Hyun Kwag, Yongin-si (KR); Sang-Hoon Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 149 days.

(21) Appl. No.: 14/674,252

(22) Filed: Mar. 31, 2015

(65) Prior Publication Data
US 2015/0311486 A1 Oct. 29, 2015

(30) Foreign Application Priority Data
Apr. 23, 2014 (KR) .................. 10-2014-0048877

(51) Int. Cl.
*H01M 2/10* (2006.01)
*H01M 10/42* (2006.01)

(52) U.S. Cl.
CPC ......... *H01M 2/1077* (2013.01); *H01M 2/105* (2013.01); *H01M 10/425* (2013.01)

(58) Field of Classification Search
CPC ... H01M 2/1077; H01M 2/105; H01M 10/425
See application file for complete search history.

(56) References Cited

U.S. PATENT DOCUMENTS

| 4,347,294 A * | 8/1982 | Mejia | H01M 2/0245 429/151 |
| 6,219,249 B1 * | 4/2001 | Tuccio | H05K 7/183 312/223.2 |
| 2010/0112425 A1 * | 5/2010 | Dunn | H01M 2/024 429/99 |
| 2010/0124693 A1 * | 5/2010 | Kosugi | G01R 31/3644 429/92 |
| 2011/0003193 A1 | 1/2011 | Park et al. | |
| 2011/0250477 A1 * | 10/2011 | Yoshida | B60L 3/0046 429/61 |
| 2012/0045665 A1 | 2/2012 | Park | |

FOREIGN PATENT DOCUMENTS

| KR | 2011-0002355 A | 1/2011 |
| KR | 2012-0016992 A | 2/2012 |
| KR | 2013-0005528 A | 1/2013 |

* cited by examiner

*Primary Examiner* — Patrick Ryan
*Assistant Examiner* — Aaron Greso
(74) *Attorney, Agent, or Firm* — Knobbe Martens Olson & Bear LLP

(57) ABSTRACT

Provided is a battery pack. The battery pack includes: a case including a cavity; a core pack that inserts into the cavity and comprising a plurality of batteries; a first cover coupled to a side of the case; and a second cover coupled to the other side of the case. The case further includes a plurality of guide grooves formed in inner corners of the case and extending in a length direction of the case, and the core pack further includes a plurality of ridges that respectively slide into the guide grooves in the length direction of the case.

19 Claims, 4 Drawing Sheets

BATTERY PACK

RELATED APPLICATIONS

This application claims the benefit of Korean Patent Application No. 10-2014-0048877, filed on Apr. 23, 2014, in the Korean Intellectual Property Office, the disclosure of which is incorporated herein in its entirety by reference.

BACKGROUND

Field

One or more embodiments of the present invention relate to a battery pack.

Description of the Related Technology

Secondary batteries are rechargeable batteries that are widely used in electric transportation devices such as electric bicycles, electric scooters, and electric vehicles, in addition to portable electronic devices such as cellular phones, laptop computers, and camcorders. According to the types of the devices to which secondary batteries are applied, secondary batteries are used individually or in the form of battery packs each including a plurality of secondary batteries connected as a unit.

Small devices such as cellular phones may be operated for a predetermined time by using single-cell secondary batteries. However, battery packs having high-output, high-capacity features may be suitable for medium or large devices that have long operating times and consume large amounts of power. These devices can include laptop computers, camcorders, electric bicycles, electric scooters, electric vehicles, and hybrid electric vehicles. The output voltages or currents of battery packs may be increased by adjusting the number of battery cells included in the battery packs.

SUMMARY

One or more embodiments of the present invention include a battery pack that has a simple structure and is highly resistant to vibration and impact.

Additional aspects will be set forth in part in the description which follows and, in part, will be apparent from the description, or may be learned by practice of the presented embodiments.

According to one or more embodiments of the present invention, a battery pack includes: a case including a cavity; a core pack that inserts into the cavity and including a plurality of batteries; a first cover coupled to a side of the case; and a second cover coupled to the other side of the case, wherein the case further includes a plurality of guide grooves formed in inner corners of the case and extending in a length direction of the case, and the core pack further includes a plurality of ridges that respectively slide into the guide grooves in the length direction of the case.

The first cover may be coupled to the case by using a plurality of fasteners, and the fasteners may be coupled to the guide grooves in the length direction of the case, respectively.

The fasteners may in one implementation be screws and may make contact with ends of the ridges in the length direction of the case, respectively.

The core pack may further include a first holder and a second holder that accommodate the batteries and may be coupled together to face each other, and the ridges may include first and second ridges formed on each of the first and second holders.

The first and second ridges may be shorter than the first and second holders in the length direction of the case, and ends of the first and second ridges may make contact with the screws, respectively.

The first holder may include a first coupling part protruding toward the second holder, and the second holder may include a second coupling part protruding toward the first holder and coupled to the first coupling part.

One of the first and second coupling parts may further include a coupling hole, and the other of the first and second coupling parts may further include a coupling protrusion that inserts into the coupling hole.

The core pack may further include a protective circuit module electrically connected to the batteries, and the first and second holders may further include bosses formed on sides thereof to support the protective circuit module and protruding in a direction perpendicular to the length direction of the case.

The first and second holders may include a plurality of accommodation holes into which the batteries may be inserted, and stoppers may be disposed on outer ends of the accommodation holes, respectively, so as to prevent separation of the batteries.

Each of the first and second holders may further include a plurality of open regions formed among the accommodation holes.

According to one or more embodiments of the present invention, a battery pack includes: a core pack including a plurality of batteries and first and second holders accommodating the batteries and coupled together to face each other; and a case accommodating the core pack, wherein the case includes a plurality of guide grooves formed in inner corners of the case and extending in a length direction of the case, and each of the first and second holders includes first and second ridges that slide into the guide grooves.

The first and second ridges may extend in the length direction of the case, and the first and second ridges may be shorter than the first and second holders in the length direction of the case.

The battery may further include a first cover coupled to a side of the case, wherein the first cover may be coupled to the case by using a plurality of fasteners, and the screws may be coupled to the guide grooves in the length direction of the case, respectively.

Each of the guide grooves may include: a circular screw hole formed in the length direction of the case; and an opening formed at a side of the circular screw hole to receive the first or second ridge.

Ends of the first and second ridges may make contact with the screws within the screw holes in the length direction of the case.

The first and second holders may include a plurality of accommodation holes into which the batteries may be inserted, and stoppers may be disposed on outer ends of the accommodation holes, respectively, so as to prevent separation of the batteries.

The first holder may include a first coupling part protruding toward the second holder, and the second holder may include a second coupling part protruding toward the first holder and coupled to the first coupling part.

One of the first and second coupling parts may further include a coupling hole, and the other of the first and second coupling parts may further include a coupling protrusion that inserts into the coupling hole.

Each of the first and second holders may further include a plurality of open regions formed among the accommodation holes.

The core pack may further include a protective circuit module electrically connected to the batteries, and the first and second holders may further include bosses formed on sides thereof to support the protective circuit module and protruding in a direction perpendicular to the length direction of the case.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
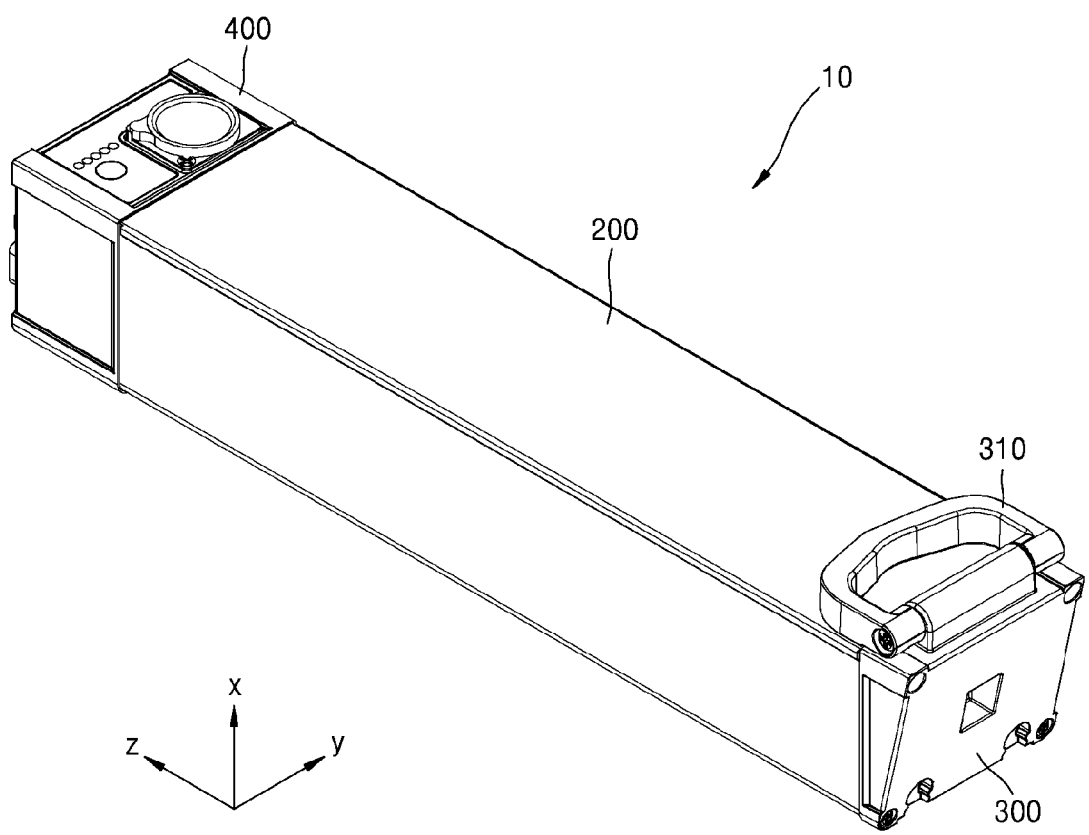
FIG. 1 is a perspective view schematically illustrating a battery pack according to an embodiment of the present invention.

Reference will now be made in detail to embodiments, examples of which are illustrated in the accompanying drawings. Effects and features of the embodiments, and implementation methods thereof will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments of the present invention will be described in detail with reference to the accompanying drawings. In the drawings, like reference numerals denote like elements, and overlapping descriptions thereof will be omitted.

In the following descriptions of the embodiments, although the terms "first" and "second" are used to describe various elements, these elements should not be limited by these terms. These terms are only used to distinguish one element from another element.

In the following descriptions of the embodiments, the terms of a singular form may include plural forms unless referred to the contrary.

In the following descriptions of the embodiments, the meaning of "include," "comprise," "including," or "comprising," specifies a property, a region, a fixed number, a step, a process, an element and/or a component but does not exclude other properties, regions, fixed numbers, steps, processes, elements.

It will be understood that when something such as an element is referred to as being "above" or "on" another element, it can be directly on the other element, or intervening elements may also be present.

In the drawings, the sizes of elements may be exaggerated for clarity. For example, in the drawings, the size or thickness of each element may be arbitrarily shown for illustrative purpose, and thus the present invention should not be construed as being limited thereto.

Figure 2:
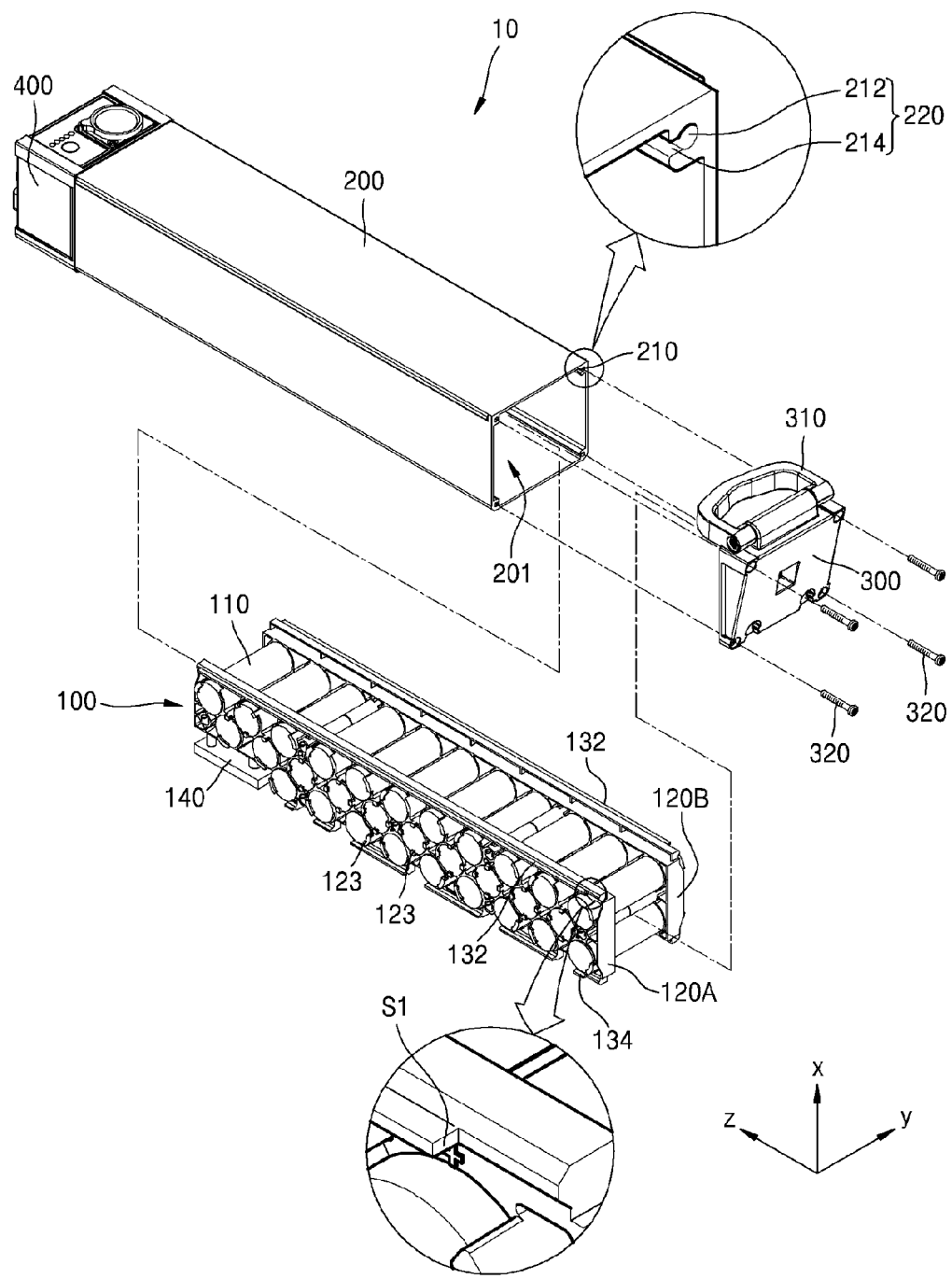
FIG. 2 is an exploded perspective view schematically illustrating the battery pack illustrated in FIG. 1.
Figure 3:
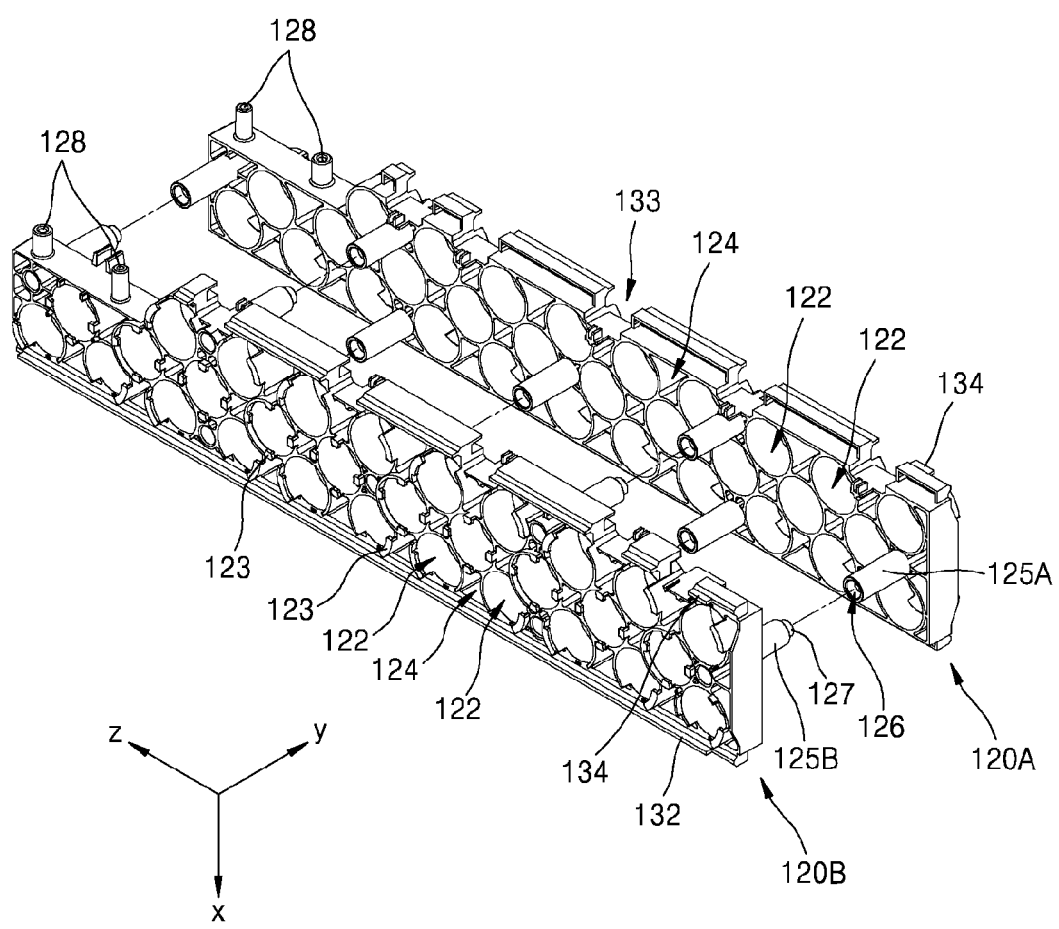
FIG. 3 is a perspective view schematically illustrating a first holder and a second holder of the battery pack illustrated in FIG. 2.
Figure 4:
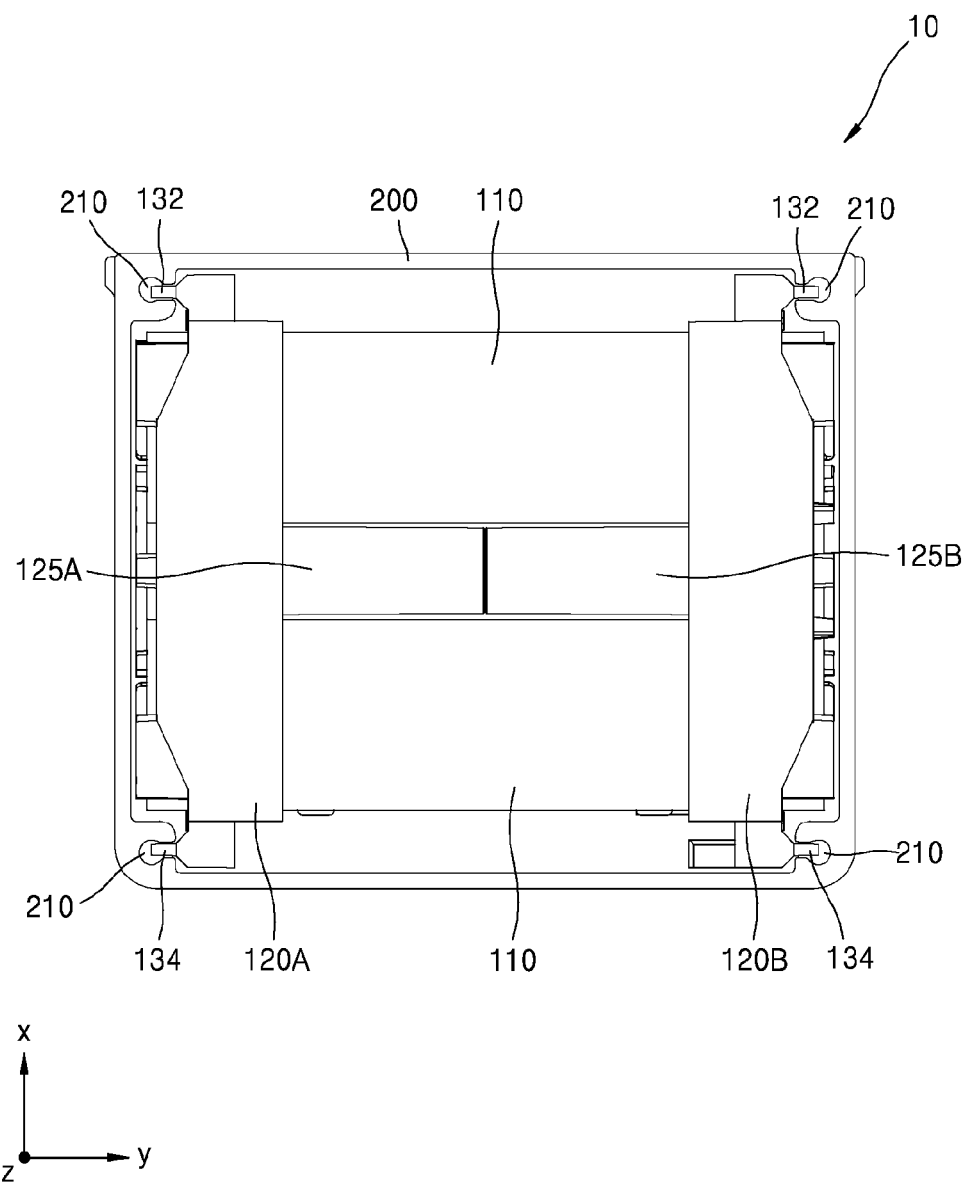
FIG. 4 is a schematic cross-sectional view taken in a direction perpendicular to a length direction of the battery pack of FIG. 1.

FIG. 1 is a perspective view schematically illustrating a battery pack 10 according to an embodiment of the present invention; FIG. 2 is an exploded perspective view schematically illustrating the battery pack 10 illustrated in FIG. 1; FIG. 3 is a perspective view schematically illustrating a first holder 120A and a second holder 120B of the battery pack 10 illustrated in FIG. 2; and FIG. 4 is a schematic cross-sectional view taken in a direction perpendicular to a length direction of the battery pack 10 illustrated FIG. 1.

Referring to FIGS. 1 to 4, the battery pack 10 of the embodiment may include a core pack 100, a case 200 accommodating the core pack 100, a first cover 300 coupled to a side of the case 200, and a second cover 400 coupled to the other side of the case 200.

The core pack 100 may include a plurality of batteries 110, the first holder 120A, and the second holder 120B. The first and second holders 120A and 120B may accommodate the batteries 110 and may be coupled facing each other. In addition, the core pack 100 may include a protective circuit module 140 that is electrically connected to the batteries 110.

The batteries 110 may be connected in series, parallel, or series-parallel or any combination thereof. Each of the batteries 110 may be a rechargeable battery including a cylindrical can and an electrode assembly and an electrolyte accommodated in the can.

The electrode assembly may include a positive electrode plate, a negative electrode plate, and a separator disposed between the positive and negative electrode plates. The electrode assembly may have a jelly-roll shape formed by winding together the positive electrode plate, the separator, and the negative electrode plate.

The positive electrode plate may include a positive electrode coating portion coated with a positive electrode active material and a positive electrode non-coating portion that is not coated with the positive electrode active material. The positive electrode active material may be a lithium-containing transition metal oxide such as $LiCoO_2$, $LiNiO_2$, $LiMnO_2$, or $LiMnO_4$, or a lithium chalcogenide.

The positive electrode coating portion may be formed by coating a portion of at least one side of an aluminum plate with the positive electrode active material, and the remaining portion of the aluminum plate that is not coated with the positive electrode active material may be the positive electrode non-coating portion.

The negative electrode plate may include a negative electrode coating portion coated with a negative electrode active material, and a negative electrode non-coating portion that is not coated with the negative electrode active material. The negative electrode active material may be a carbon material such as crystalline carbon, amorphous carbon, a carbon composite, or carbon fiber, a lithium metal, or a lithium alloy.

The negative electrode coating portion may be formed by coating a portion of at least one side of a copper plate with the negative electrode active material, and the remaining portion of the copper plate that is not coated with the negative electrode active material may be the negative electrode non-coating portion.

For example, the separator may be formed by coating a base film with a polyvinylidene fluoride and hexafluoro propylene (PVDF-HFP co-polymer). The base film may be formed of a material selected from the group consisting of co-polymers of polyethylene (PE), polystyrene (PS), polypropylene (PP) and polyethylene (PE), and polypropylene (PP). However, the separator is not limited thereto.

The first and second holders 120A and 120B may be coupled to face each other. The first and second holders 120A and 120B may include a plurality of accommodation holes 122 for accommodating the batteries 110.

The first holder 120A may include first coupling parts 125A protruding toward the second holder 120B. The second holder 120B may include second coupling parts 125B protruding toward the first holder 120A. The first coupling parts 125A or the second coupling parts 125B may include coupling holes 126, and the other may include coupling protrusions 127 configured to be inserted into the coupling holes 126.

In an embodiment shown in FIG. 3, the first coupling parts 125A include the coupling holes 126. However, the embodiments of the present invention are not limited thereto. That is, unlike the embodiment shown in FIG. 3, the first coupling parts 125A may include the coupling protrusions 127. In addition, after the coupling protrusions 127 are inserted into the coupling holes 126, screws may be inserted into the coupling protrusions 127 and the coupling holes 126.

The accommodation holes 122 penetrate the first holder 120A or the second holder 120B and have the same shape as an external shape of the batteries 110. The depth of the accommodation holes 122 may be less than the length of the batteries 110. For example, the depth of the accommodation holes 122 may be less than half the length of the batteries 100.

Therefore, after sides of the batteries 110 are inserted into the accommodation holes 122 of the first holder 120A and the other sides of the batteries 110 are inserted into the accommodation holes 122 of the second holder 120B, surfaces of the batteries 110 that are between the first and second holders 120A and 120B may be exposed, and thus the batteries 110 are less likely to overheat. For example, the exposed length of the batteries 110 between the first and second holders 120A and 120B may be equal to the sum of the lengths of the first and second coupling parts 125A and 125B.

Stoppers 123 may be disposed on outer ends of the accommodation holes 122. The stoppers 123 may protrude in a direction crossing the accommodation holes 122 and may make contact with upper or lower surfaces of the batteries 110 inserted into the accommodation holes 122 so as to prevent separation of the batteries 110.

Each of the first and second holders 120A and 120B may further include open regions 124 among the accommodation holes 122. Like the accommodation holes 122, the open regions 124 may be empty spaces penetrating the first holder 120A or the second holder 120B.

The first and second holders 120A and 120B may be formed by injecting a resin into a mold. In this case, if the open regions 124 are not formed in the first and second holders 120A and 120B, regions corresponding to the open regions 124 may be filled with the resin and may be slowly solidified, as compared to other thin regions such as regions between the accommodation holes 122. When the first and second holders 120A and 120B are formed of a resin, if the solidification rate of the resin varies according to regions of the first and second holders 120A and 120B as described above, the first and second holders 120A and 120B may be distorted.

Therefore, the open regions 124 are formed in the first and second holders 120A and 120B to prevent distortion of the first and second holders 120A and 120B. In addition, since the open regions 124 are empty spaces, the weight of the core pack 100 may be reduced owing to the formation of the open regions 124. Furthermore, since the open regions 124 are formed among the accommodation holes 122, the batteries 110 may be cooled more efficiently.

Each of the first and second holders 120A and 120B may include a first ridge 132 and a second ridge 134. The first and second ridges 132 and 134 may be parallel to each other and may protrude from both outer edges of the first and second holders 120A and 120B. The first and second ridges 132 and 134 may extend in a length direction (z-axis direction) of the case 200. The first ridges 132 or the second ridges 134 may include cut-away portions 133 to accommodate wires electrically connecting the batteries 110.

The first and second ridges 132 and 134 may be shorter than the first and second holders 120A and 120B and may be slid into guide grooves 210 (described later) formed in inner corners of the case 200.

The first and second holders 120A and 120B may include bosses 128 formed on sides thereof. The bosses 128 may support the protective circuit module 140 and protrude in a direction perpendicular to the length direction (z-axis direction) of the case 200.

The protective circuit module 140 may include a board and a plurality of electronic devices disposed on the board. The protective circuit module 140 may control operations of the batteries 110. For example, the board may be a printed circuit board on which a circuit pattern is printed. For example, the electronic devices may include: safety device formed of passive elements such as resistors and capacitors and active elements such as field effect transistors; and switching deices such as integrated circuits (ICs).

Conductive plates (not shown) may be coupled to outer sides of the first and second holders 120A and 120B, respectively. The conductive plates may electrically connect the batteries 110 accommodated in the first and second holders 120A and 120B.

The core pack 100 described above may be accommodated in the case 200. The case 200 may include a cavity 201, and the core pack 100 may be inserted into the cavity 201.

The case 200 may be formed of a metallic material having high thermal conductivity such as aluminum so as to effectively dissipate heat generated from the batteries 110.

In addition, the case 200 may include guide grooves 210 extending in the length direction (z-axis direction) thereof. For example, the guide grooves 210 may be formed in inner corners of the case 200, respectively.

Ridges formed on the core pack 100 may be slid into the guide grooves 210, respectively. The plurality of ridges may be the first and second ridges 132 and 134 of the first and second holders 120A and 120B.

That is, as shown in FIG. 4, when the core pack 100 is inserted into the cavity 201 of the case 200, the first and second ridges 132 and 134 are slid into the guide grooves 210. In this way, the core pack 100 and the case 200 may be easily coupled together by only inserting the core pack 100 into the case 200.

Furthermore, after the first and second ridges 132 and 134 are slid into the guide grooves 210, movement of the core pack 100 may be effectively prevented in lateral directions (x-axis and y-axis directions) of the battery pack 10.

The first cover 300 is coupled to a side of the case 200. The first cover 300 may include a handle 310 so that a user may easily attach or detach the battery pack 10 to a device or carry the battery pack 10 by using the handle 310.

The first cover 300 may be coupled to the case 200 by using a plurality of screws 320. The screws 320 may be coupled to the guide grooves 210 in the length direction (z-axis direction) of the case 200. The screws 320 respectively coupled to the guide grooves 210 may make contact with ends S1 of the first and second ridges 132 and 134 so as to prevent movement of the core pack 100 in the length direction (z-axis direction) of the case 200.

In detail, each of the guide grooves 210 may include a circular screw hole 212 and an opening 214 formed at a side of the circular screw hole 212. The screws 320 may be inserted into the circular screw holes 212, and the first and second ridges 132 and 134 may be inserted into the openings 214.

Since the length of the first and second ridges 132 and 134 is less than the length of the first and second holders 120A and 120B in the length direction (z-axis direction) of the case 200, the ends S1 of the first and second ridges 132 and 134 inserted into the guide grooves 210 may make contact with the screws 320 inserted into the circular screw holes 212, respectively.

If the screws 320 make contact with the ends S1 of the first and second ridges 132 and 134 as described above, movement of the core pack 100 in the length direction (z-axis direction) of the case 200 may be effectively inhibited.

That is, in the battery pack 10 of the embodiment of the present invention, movement of the core pack 100 slid into the case 200 may be effectively inhibited by coupling the first cover 300 to a side of the case 200. Therefore, the battery pack 10 may be simply manufactured to have a stable structure resistant to vibration and impact.

The second cover 400 is coupled to the other side of the case 200. The second cover 400 may include a charge connector for connection with an external power supply (not shown). Like the first cover 300, the second cover 400 may be coupled to the case 200 by using screws, and the other ends of the first ridges 132 may make contact with the screws. Therefore, movement of the core pack 100 in the length direction (z-axis direction) of the case 200 may be prevented more effectively.

As described above, according to the one or more of the above embodiments of the present invention, a battery pack may be manufactured through a simple process and may have a stable structure resistant to vibration and impact.

The effects of the embodiments of the present invention may be understood from the above description with reference to the accompanying drawings.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A battery pack comprising:
a case comprising a cavity having a length direction and a width direction;
a core pack that inserts into the cavity and comprising a plurality of batteries;
a first cover coupled to a side of the case; and
a second cover coupled to the other side of the case,
wherein the case further comprises a plurality of guide grooves having a first and second end formed in inner corners of the case and extending in a length direction of the case, and
the core pack further comprises a plurality of ridges that respectively slide into the guide grooves in the length direction of the case wherein plurality of ridges have a first side and a second side and wherein the plurality of guide grooves have a first and second side that are positioned adjacent the first and second side of a respective one of the plurality of ridges when the ridge is slid into the respective guide groove and wherein the first cover is coupled to the case using a plurality of fasteners having a shaft with an axis and wherein the shaft is positioned within at least one of the first and second end of the guide grooves so that the axis of the shaft extends along the length of the guide groove.

2. The battery pack of claim 1, wherein the fasteners comprise screws.

3. The battery pack of claim 1, wherein the core pack further comprises a first holder and a second holder that accommodate the batteries and are coupled together to face each other, and
the ridges comprise first and second ridges formed on each of the first and second holders.

4. The battery pack of claim 3, wherein the first and second ridges are shorter than the first and second holders in the length direction of the case, and
ends of the first and second ridges make contact with the fasteners, respectively.

5. The battery pack of claim 3, wherein the first holder comprises a first coupling part protruding toward the second holder, and
the second holder comprises a second coupling part protruding toward the first holder and coupled to the first coupling part.

6. The battery pack of claim 5, wherein one of the first and second coupling parts further comprises a coupling hole, and the other of the first and second coupling parts further comprises a coupling protrusion that inserts into the coupling hole.

7. The battery pack of claim 3, wherein the core pack further comprises a protective circuit module electrically connected to the batteries, and
the first and second holders comprise bosses formed on sides thereof to support the protective circuit module and protruding in a direction perpendicular to the length direction of the case.

8. The battery pack of claim 3, wherein the first and second holders comprise a plurality of accommodation holes into which the batteries are inserted, and
stoppers are disposed on outer ends of the accommodation holes, respectively, so as to prevent separation of the batteries.

9. The battery pack of claim 8, wherein each of the first and second holders further comprises a plurality of open regions formed among the accommodation holes.

10. A battery pack comprising:
a core pack comprising a plurality of batteries and first and second holders accommodating the batteries and coupled together to face each other; and
a case accommodating the core pack having a length direction,
wherein the case comprises a plurality of guide grooves having first and second ends formed in inner corners of the case and extending in a length direction of the case, and each of the first and second holders comprises first and second ridges that slide into the guide grooves wherein plurality of ridges have a first side and a second side and wherein the plurality of guide grooves have a first and second side that are positioned adjacent the first and second side of a respective one of the plurality of ridges when the ridge is slid into the respective guide groove and wherein the first cover is coupled to the case using a plurality of fasteners having a shaft with an axis and wherein the shaft is positioned within at least one of the first and second end of the guide grooves so that the axis of the shaft extends along the length of the guide groove.

11. The battery pack of claim 10, wherein the first and second ridges extend in the length direction of the case, and
the first and second ridges are shorter than the first and second holders in the length direction of the case.

12. The battery pack of claim 11, further comprising a first cover coupled to a side of the case,
wherein the first cover is coupled to the case by using a plurality of fasteners, and
the fasteners are coupled to the guide grooves in the length direction of the case, respectively.

13. The battery pack of claim 12, wherein each of the guide grooves comprises:
a circular hole formed in the length direction of the case; and
an opening formed at a side of the circular hole to receive the first or second ridge.

14. The battery pack of claim 13, wherein ends of the first and second ridges make contact with the screws within the screw holes in the length direction of the case.

15. The battery pack of claim 10, wherein the first and second holders comprise a plurality of accommodation holes into which the batteries are inserted, and
stoppers are disposed on outer ends of the accommodation holes, respectively, so as to prevent separation of the batteries.

16. The battery pack of claim 15, wherein the first holder comprises a first coupling part protruding toward the second holder, and
the second holder comprises a second coupling part protruding toward the first holder and coupled to the first coupling part.

17. The battery pack of claim 16, wherein one of the first and second coupling parts further comprises a coupling hole, and the other of the first and second coupling parts further comprises a coupling protrusion that inserts into the coupling hole.

18. The battery pack of claim 15, wherein each of the first and second holders further comprises a plurality of open regions formed among the accommodation holes.

19. The battery pack of claim 10, wherein the core pack further comprises a protective circuit module electrically connected to the batteries, and
the first and second holders further comprise bosses formed on sides thereof to support the protective circuit module and protruding in a direction perpendicular to the length direction of the case.

* * * * *